United States Patent [19]

Takahashi

[11] 4,114,364

[45] Sep. 19, 1978

[54] DRIVING PULSE WIDTH CONTROLLING CIRCUIT FOR A TRANSDUCER OF AN ELECTRONIC TIMEPIECE

[75] Inventor: Norio Takahashi, Tokyo, Japan

[73] Assignee: Kabushiki Kaisha Daini Seikosha, Japan

[21] Appl. No.: 763,714

[22] Filed: Jan. 28, 1977

[30] Foreign Application Priority Data

Jan. 29, 1976 [JP] Japan .................................. 51-8631

[51] Int. Cl.[2] .......................... G04C 3/00; H02P 7/00

[52] U.S. Cl. ................................ 58/23 D; 58/23 BA; 318/317

[58] Field of Search ............ 58/23 AD, 23 BA, 23 D; 235/92 T, 92 EA, 156; 318/14, 317, 430, 432, 434, 127-129, 134, 139, 699; 315/169 TV

[56] References Cited

U.S. PATENT DOCUMENTS

| | | | |
|---|---|---|---|
| 3,812,670 | 5/1974 | Nikaido et al. | 58/23 D |
| 3,855,781 | 12/1974 | Chihara et al. | 58/23 D |
| 3,892,066 | 2/1974 | Watkins | 58/23 A |
| 3,969,642 | 7/1976 | Yoshino | 58/23 D |
| 3,971,204 | 7/1976 | Kawaguchi et al. | 58/23 BA |
| 3,992,868 | 11/1976 | Tamaku et al. | 58/23 BA |
| 4,001,808 | 1/1977 | Ebihara et al. | 58/50 R |
| 4,011,713 | 3/1977 | Sauthier et al. | 58/23 BA |

*Primary Examiner*—Edith S. Jackmon
*Attorney, Agent, or Firm*—Robert E. Burns; Emmanuel J. Lobato; Bruce L. Adams

[57] ABSTRACT

In an analogue electronic timepiece having a transducer comprising a rotor, a stator and a driving coil, means is provided for supplying to the driving coil, periodic pulses of a selected width to drive the rotor. The width of the pulses is automatically controlled according to the load of the transducer so as to reduce power consumption and accordingly to increase the useful life of the battery by which power is supplied.

4 Claims, 5 Drawing Figures

DRIVING PULSE WIDTH CONTROLLING CIRCUIT FOR A TRANSDUCER OF AN ELECTRONIC TIMEPIECE

FIELD OF INVENTION

The present invention relates to analogue electronic timepieces and particularly to means for controlling the width of pulses supplied to the driving coil of a transducer in order to reduce power consumption and thereby increase the useful life of a battery which supplies power for the timepiece.

BACKGROUND OF THE INVENTION

Conventionally in an analogue electronic timepiece having a transducer driven by periodic pulses the pulse width has a fixed value of, for example, 15.6ms, 7.8ms or the like. In designing the circuitry the pulse width is determined by the performance characteristics of the transducer and by the load on the transducer so that the pulse width is sufficient for driving the transducer under all conditions.

SUMMARY OF THE INVENTION

It is an object of present invention to provide a circuit for adjusting the pulse width automatically according to the load of the transducer so as to reduce power consumption of an analogue electronic timepiece and thereby prolong the power cell life.

BRIEF DESCRIPTION OF DRAWINGS

The nature, objects and advantages of the invention will be more fully understood from the following description of a preferred embodiment of the invention shown by way of example in the accompanying drawings in which.

DESCRIPTION OF PREFERRED EMBODIMENT

Figure 1:
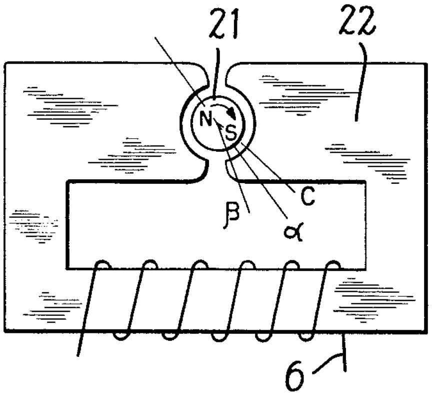
FIG. 1 is an enlarged schematic view showing the construction of a transducer

FIG. 1 is a plan view of a transducer comprising a rotor 21, a stator 22 and a driving coil 6 on the stator. The rotor 21 is a bipolar magnet which assumes a predetermined stationary position when the current in the coil 6 is cut off.

Figure 2:
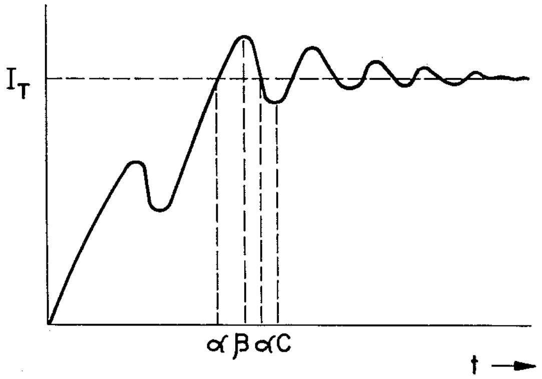
FIG. 2 is a curve showing the relation between the current flowing through the driving coil of the transducer and the rotor position

FIG. 2 shows the relation between the current flowing through the coil 6 and the angle of rotation of the rotor 21. When the rotor 21 rotates, a counter voltage is induced in the coil 6 and the wave form of the current becomes uneven. When the current in the coil 6 is equal to $I_T$, the rotor 21 is in a position opposite to the stationary position i.e. a position rotated 180 degrees from the stationary position. $I_T$ is a value which is the voltage of the power supply divided by the direct current resistance of the coil 6. In order to conserve power it is desired to cut off the electric current when the flow of current through the coil 6 reaches the value $I_T$.

Figure 3:
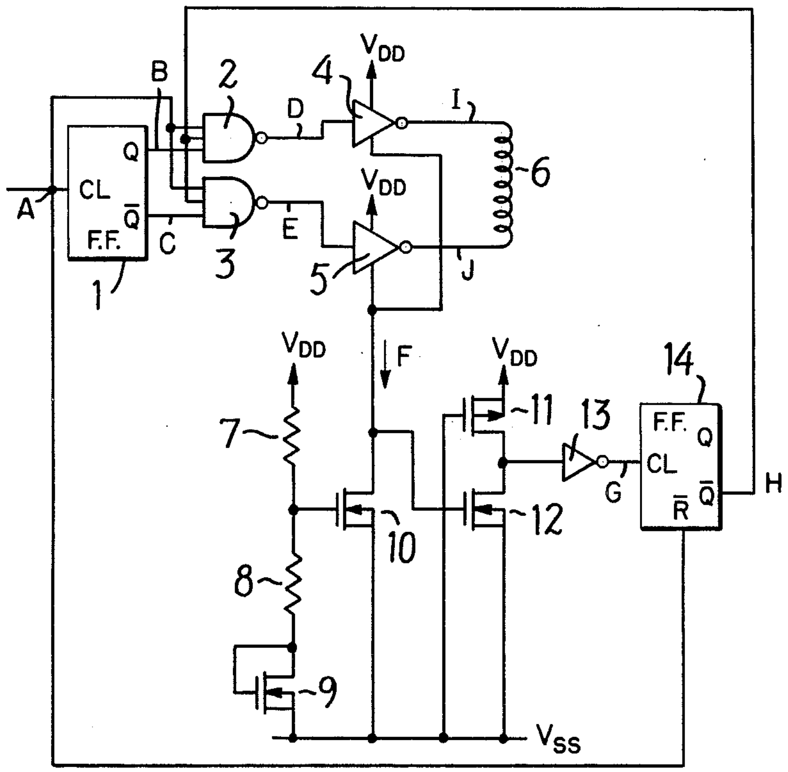
FIG. 3 is a circuit diagram of a preferred embodiment of the present invention

FIG. 3 is a circuit diagram of a preferred embodiment of the present invention providing means for controlling the pulse width according to the load of the transducer. Current is supplied to the transducer driving coil 6 by two transducer driving inverter 4 and 5 which are controlled by NAND circuits 2 and 3. The three inputs of NAND circuit 2 are connected respectively to a point A to which a clock pulse is applied (for example by the divided frequency of a quartz crystal oscillator, not shown) the $\overline{Q}$ terminal of a flip flop 14 and the Q terminal of a flip flop 1. The three input terminals of the NAND circuit 3 are connected respectively to point A, the $\overline{Q}$ terminal of flip flop 14 and the $\overline{Q}$ terminal of flip flop 1. The clock signal input A is also connected to the CL terminal of flip flop 1 and the $\overline{R}$ terminal of flip flop 14.

The width of pulses supplied to the driving coil 6 of the transducer is controlled by a circuit comprising an N channel MOS transistor 10 the gate of which is connected to a voltage divider comprising resistors 7 and 8 and an N channel MOS transistor 9. The source of the N-MOS transistor 10 is connected to the power supply $V_{SS}$. The drain of the N-MOS transistor 10 is connected to the transducer driving inverters 4 and 5 and also to the gate of an N channel MOS transistor 12 of which a P channel transistor 11 is used as MOS resistance. The source of N-MOS transistor 12 is connected to the power supply line $V_{SS}$ while the drain is connected through an inverter 13 to the CL terminal of the flip flop 14.

Figure 4:
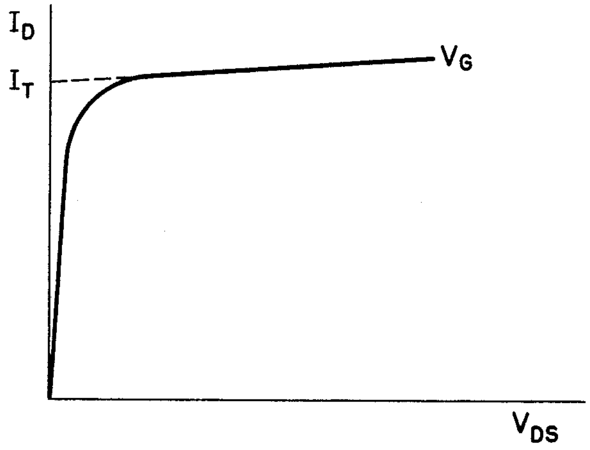
FIG. 4 is a curve showing the operating characteristics of a transistor in the pulse width control circuit and FIG. 5 is a time chart illustrating the operation of the embodiment of the invention shown in FIG. 3.
Figure 5:
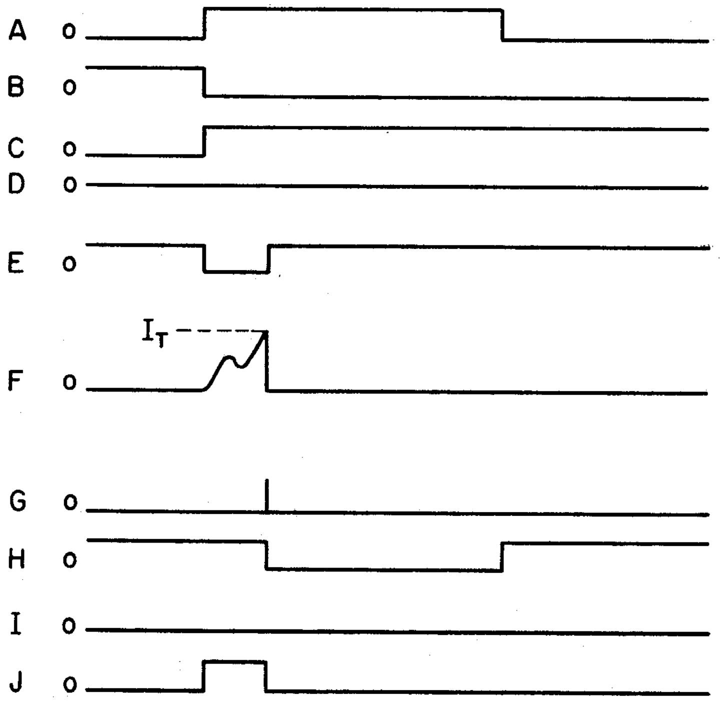

The operation of the circuitry in accordance with the present invention will now be described with reference to FIGS. 3, 4 and 5. The voltage between the gate and the source of the N-MOS transistor 10 is set so that the saturation current becomes $I_T$ as shown in FIG. 4. Thus by way of example $I_T$ is 530μA when the voltage of the power source is 1.57V and the direct current resistance of the coil is 3KΩ. The saturation current $I_T$ of the transistor is represented by the following equation:

$$I_T - K(V_G - V_T)^2$$

where K is the conductive coefficient of the transistor 10, $V_G$ is the voltage between the gate and source and $V_T$ is the threshold voltage. Therefore $V_T$, $V_G$ and K of the transistor 10 are set so that $I_T$ becomes 530μA. The value of $V_G$ is set by the resistances 7 and 8 and the transistor 9.

When the $I_T$ current flows through the transistor 10, the voltage between the drain and the source increases. The current flow is detected by the transistor 12 which acts through the invertor 13 and flip flop 14 to cut off the driving pulse. A time chart illustrating the operation is shown in FIG. 5. The curves of FIG. 5 are designated by the same letters as the corresponding parts of the circuit in FIG. 3.

In the circuitry of FIG. 3 the transistor 9 compensates for dispersion due to the manufacturing process of the parameter characteristics of the N-MOS transistor 10. In the transistor 10 K and $V_T$ are determined so that; $I_D = K(V_G - V_T)^2 = I_T$.

However when $V_T$ goes down to the designed value, $I_D$ increases so that $I_D > I_T$. In this case $I_D$ is made equal to $I_T$ by decreasing $V_G$ corresponding to variation of $V_T$. The drain and the gate of the transistor 9 are connected so that the transistor operates in saturation state. Therefore, if K of the transistor becomes large, the voltage between the drain and the source of the transistor becomes $V_T$.

Since the transistors 9 and 10 are made through the same process, $V_T$ of the two transistors are equal. Therefore the lower $V_T$ of the transistor 10 becomes, the lower $V_T$ of the transistor 9 also becomes. Then the voltage between the gate and the source of the transistor 10 decreases and an increase in $I_D$ caused by decrease in $V_T$ is revised.

According to FIG. 3 the source of the N channel transistor of the transducer driving invertor is common and the transistor is connected with the power source in series. However it is to be understood that the circuit operates as well if the source of the B channel transistor is common.

When the current which flows through the coil 6 reaches $I_T$, the rotor has rotated through an arc of 180°. Actually however, the rotor rotates by inertia even if the pulse is cut off before hand. Therefore the power consumption can be decreased more if the saturation current is set less than $I_T$.

It will thus be seen that according the the present invention power consumption of the transducer decreases and power cell life is prolonged. At the same time since the pulse width varies according to the load of the transducer, the transducer operates stably even though there is a variation of load.

While a preferred embodiment of the invention is illustrated in the drawings and is herein particularly described, it will be understood that modifications and variations may be made and that the invention is thus in no way limited to the illustrated embodiments.

What I claim is:

1. In an analogue electronic timepiece, the combination of a transducer comprising a rotor, a stator and a driving coil, means including a power source for periodically supplying to said driving coil electric pulses of a selected width to drive the rotor and means for automatically controlling the pulse width according to the load of the transducer and thereby reduce power consumption, said pulse supplying means comprising two transducer driving inverters of which the outputs are connected respectively to opposite terminals of said driving coil, means supplying a clock signal, a first flip-flop having Q, $\overline{Q}$ and CL terminals, a second flip-flop having $\overline{Q}$, CL and $\overline{R}$ terminals, a first NAND circuit having output terminal connected with one of said transducer driving inverters and three inputs connected respectively with said clock signal supply means, the $\overline{Q}$ terminal of said second flip-flop and the Q terminal of said first flip-flop, and a second NAND circuit having an output connected to the other transducer driving inverter and three inputs connected respectively with said clock signal supply means, said $\overline{Q}$ terminal of said second flip-flop and the $\overline{Q}$ terminal of said first flip-flop.

2. A combination according to claim 1, in which said pulse width controlling means comprises means for sensing the current of said driving coil and means for terminating the driving pulse applied to said coil when said current reaches a predetermined value.

3. A combination according to claim 2, in which said current sensing means comprises an MOS transistor connected between said transducer driving inverters and a power source and means for terminating the driving pulse when the current of said transistor reaches a saturation value.

4. A combination according to claim 3, in which the saturation current value of said transistor is lower than the value of the voltage of the power source divided by the direct current resistance of the transducer driving coil.

* * * * *